United States Patent [19]
Hengeveld et al.

[11] Patent Number: 6,035,196
[45] Date of Patent: Mar. 7, 2000

[54] AUTOMATIC CELL TRANSFER BASED ON REVERSE CHANNEL CHARACTERISTICS

[75] Inventors: Thomas Hengeveld, Hollis, N.H.; Dennis Martinez, Westford, Mass.

[73] Assignee: The Whitaker Corporation, Wilmington, Del.

[21] Appl. No.: 08/918,277

[22] Filed: Aug. 25, 1997

[51] Int. Cl.[7] ................................................. H04Q 7/38
[52] U.S. Cl. ..................... 455/437; 455/442; 455/525; 455/522
[58] Field of Search ................................ 455/436, 437, 455/439, 421, 452, 442, 443, 440, 441; 370/331–333

[56] References Cited

U.S. PATENT DOCUMENTS

| | | | |
|---|---|---|---|
| 4,517,669 | 5/1985 | Freeburg et al. | 370/82 |
| 4,519,068 | 5/1985 | Krebs et al. | 370/82 |
| 4,590,473 | 5/1986 | Burke et al. | 340/825.52 |
| 4,636,791 | 1/1987 | Burke et al. | 340/825.52 |
| 4,644,351 | 2/1987 | Zarbarsky et al. | 340/825.44 |
| 4,670,899 | 6/1987 | Brody et al. | 379/60 |
| 4,670,905 | 6/1987 | Sandvos et al. | 455/33 |
| 4,737,978 | 4/1988 | Burke et al. | 379/60 |
| 4,887,265 | 12/1989 | Felix | 370/94.1 |
| 5,475,868 | 12/1995 | Duque-Anton et al. | 455/452 |
| 5,483,669 | 1/1996 | Barnett et al. | 455/436 |
| 5,491,717 | 2/1996 | Hall | 455/436 |
| 5,491,834 | 2/1996 | Chia | 455/436 |
| 5,711,004 | 1/1998 | Blasiak et al. | 455/436 |
| 5,722,068 | 2/1998 | Bartle et al. | 455/421 |
| 5,722,072 | 2/1998 | Crichton et al. | 455/437 |
| 5,845,212 | 10/1996 | Tanaka | 455/437 |
| 5,960,347 | 10/1997 | Ozluturk | 455/442 |

FOREIGN PATENT DOCUMENTS

| | | | |
|---|---|---|---|
| 0768804 A2 | 10/1995 | European Pat. Off. | H04Q 7/38 |
| 2705181 | 1/1994 | France | H04L 29/06 |

OTHER PUBLICATIONS

IEEE Catalogue No. 87–CH2482–8, Conference Proceedings Victoria, B.C. Canada, Jun. 4–5, 1987, pp. 264–267.

IEEE 0733–8716/84/07000–0472$01.00, 1984 ARQ Schemes for Data Transmission in Mobile Radio Systems, Richard A. Comroe and Daniel J. Costello, Jr, pp. 472–481.

IEEE Transactions on Communications, vol. COM–23, No. 12, Dec. 1975 Packet Switching in Radio Channels: Part 1–Carrier Sense Multiple–Access Modes and Their Throughput–Delay Characteristics, Leonard Kleinrock and Fouad A. Tobagi.

CDPD System Specification, Release 1.1 Jan. 19, 1995, Radio Resource Management, Part 405, pp. 405–1,–405–50.

PCT International Search Report, Application No. PCT/US98/16765, International filing date Aug. 25, 1998.

*Primary Examiner*—Reinhard J. Eisenzopf
*Assistant Examiner*—Duc Nguyen

[57] ABSTRACT

In a distributed communication system, a mobile initiates a cell transfer or channel top based upon an assessment of measured parameters on the reverse channel. Advantageously, a mobile initiates a cell transfer in response to either a reverse channel utilization or reverse channel success rate.

16 Claims, 4 Drawing Sheets

AUTOMATIC CELL TRANSFER BASED ON REVERSE CHANNEL CHARACTERISTICS

FIELD OF THE INVENTION

The present invention relates to cellular communication systems and more particularly to transfer of communication between a remote mobile device and base stations.

BACKGROUND OF THE INVENTION

Communication over mobile devices is known. Typically, the mobile communication device ("the mobile") has a direct RF or microwave communication link with a base station. The geographic area within which a mobile maintains the direct communication link with the base station is defined as a cell, a single base station thereby establishing a single cell. The plurality of base stations communicate with each other via cables and/or through existing telephone infrastructure. In order for a mobile to operate effectively in a large geographic area, there is a plurality of base stations with overlapping cells establishing an area of coverage over which a mobile may establish a communication link. When a mobile to base communication link is established, the base station further routes the transmission from the mobile to its intended destination. As the mobile travels throughout the geographic area, it passes in and out of established cells. The direct communication link between the mobile and the base station changes from a first base station to a second base station as the mobile moves out of a first cell and into a second cell. The transfer of the direct communication link from the first base station to the second base station is preferably seamless in that occurs without operator intervention and without loss of information during the transfer.

Various systems are known to effect the necessary transfer from the first base station to the second base station when the quality of the communication link is no longer acceptable. U.S. Pat. No. 4,308,429 discloses a method whereby a cell transfer or roaming decision is made centrally based on an assessment of the signal quality from the mobile to the base station. In the '429 patent disclosure, the first base station monitors a signal strength received by the mobile for the established communication link. If the received signal strength is below a certain threshold value, the first base station polls adjacent base stations to find a second base station having a stronger received signal strength from the mobile. The first base station then commands the mobile to transfer the direct communication link from the first base station to the second base station that has been identified as having the stronger received signal strength. In a voice communication system, signal strength is an acceptable parameter with which to assess transmission integrity. In a communication system that transmits data, however, the signal strength may not accurately indicate whether the established communication link is adequately communicating the informational content of the transmitted signal. Additionally, the centralized cell transfer initiation requires communication and arbitration between base stations. This inter-base station communication generates administrative traffic flow and complicates the system. The increased traffic flow represents system administration overhead which occupies communication bandwidth without contributing to communication capacity, thereby reducing the efficiency of the system. The centralized cell transfer initiation method also assumes that all base stations can identify all mobiles and can measure a mobile's transmission parameter in order to make a relative judgment as to which base station can better service a mobile at any one time. Due to certain practical limitations, the assumption that all base stations make similar measurements is not consistently true. As a result, a cell transfer may be initiated in error.

An alternative system for cell transfer is disclosed in U.S. Pat. No. 4,829,519 in which the mobile makes the decision to transfer the direct communication link to a different cell when the mobile detects a bit error rate above a certain exit threshold value. In the '519 patent disclosure, each base station in a plurality of base stations periodically transmits a known quality assessment message. The mobile continuously assesses the bit error rate in the known quality assessment message transmission and makes a decision to search for a new cell if the bit error rate is above a certain exit threshold value. The mobile then searches for a second base station by monitoring the bit error rate of the known quality assessment message from a plurality of base stations until the bit error rate of one of the base stations is below a certain entry threshold value defining a second base station. The mobile then transfers the direct communication link to the second base station. The cell transfer is initiated based upon an assessment of the forward channel communication. Disadvantageously, if the reverse channel is disadvantaged relative to the forward channel, the assessment of the forward channel quality is not a true measure of the quality of the communications link.

There is a need, therefore, for an improved cell transfer method that solves the disadvantages present in the prior art.

SUMMARY OF AN EMBODIMENT OF THE PRESENT INVENTION

In a distributed communication system, a mobile has an established communication link with a first base station. The communication link comprises a reverse channel wherein the mobile communicates to the base station and a forward channel wherein the base station communicates to the mobile. A cell transfer method comprises the steps of the mobile measuring one or more reverse channel transmission parameters and assessing the one or more measured transmission parameters against one or more thresholds. The mobile searches for a second base station based upon the one or more measured transmission parameters as compared against the one or more thresholds.

It is a feature of an embodiment of the present invention that in a distributed communication system, a decision to initiate a search for a second base station is made by the mobile based upon reverse channel transmission parameters.

It is a further feature of an embodiment of the present invention that in a distributed communication system, the decision to initiate a search for a second base station is made by the mobile based upon reverse channel transmission parameters as transmitted by the base station and as measured by the mobile.

It is an advantage of an embodiment of the present invention that in a distributed communication system, a robust cell transfer occurs with a decreased risk of improper cell transfer and information transmission loss.

It is a further advantage of an embodiment of the present invention that in a distributed communication system, the decision to initiate a cell transfer is based upon the performance of the communications link, including both forward and reverse channel transmission parameters.

It is a further advantage of an embodiment of the present invention that in a distributed communication system, the decision to initiate a cell transfer is based upon an availability of capacity of a communications link.

BRIEF DESCRIPTION OF THE DRAWINGS

Embodiments of the invention will now be described by way of example and with reference to the following drawings in which.

DETAILED DESCRIPTION OF EMBODIMENT OF THE PRESENT INVENTION

Figure 1:
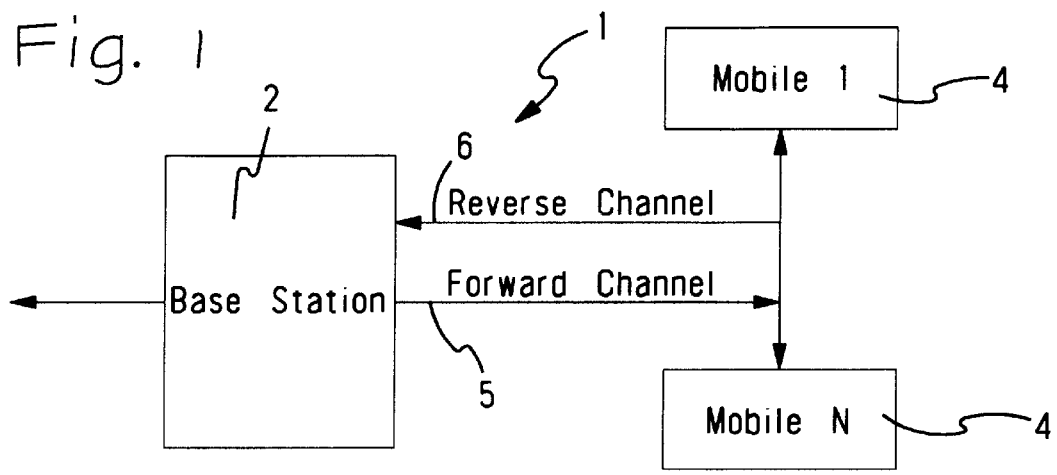
FIG. 1 is a conceptual view of a direct communications link between a mobile and a base station for a full duplex embodiment of a system according to the teachings of the present invention.
Figure 2:
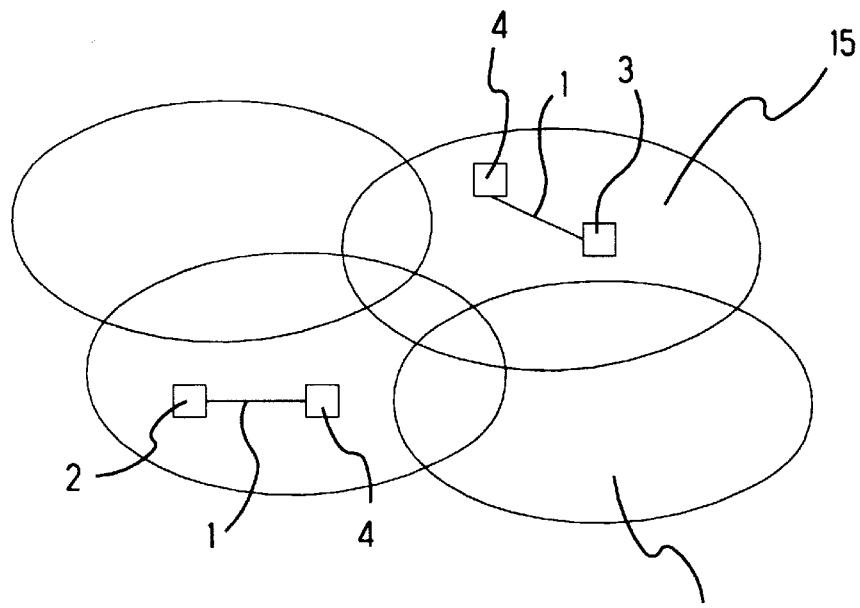
FIG. 2 is a diagrammatic view of a plurality of adjacent cells defined by areas of communication coverage of respective base stations in an embodiment of a distributed communications system according to the teachings of the present invention.

With specific reference to FIG. 1 of the drawings, there is shown a diagrammatic illustration of a communications link 1 between a first base station 2 and a plurality of mobiles 4. In a specifically disclosed embodiment, the communications link 1 is implemented by a half duplex radio in a mobile over a full duplex channel. The base station 2 is implemented with a full duplex radio. The teachings of the present invention, however, are equally applicable to a half duplex channel between the mobile 4 and the base station 2 and to a full duplex channel implemented with a mobile 4 having a full duplex radio. The communications link 1 comprises a forward channel 5 wherein the base station 2 transmits an RF signal at a first frequency to all of the mobiles 4 and a reverse channel 6 wherein the mobiles 4 contend for transmission of an RF signal to the base station 2 at a second frequency. In an embodiment of a full duplex distributed communications system, the forward channel 5 and the reverse channel 6 are a logical pair, separated in transmission frequency of the carrier signal by 45 MHz. RF communication is achieved using frequency modulated four level Gaussian Frequency Shift Keying (GFSK). RF communication may be implemented with any other known modulation scheme such as quadrature amplitude modulation. As the base station 2 receives information transmitted by each of the mobiles 4, it further conveys the information to its intended destination. The geographic reach between the base station 2 and the mobiles 4 defines a cell 15 within which the mobiles 4 may travel and maintain the established communications link 1 with the base station 2. A distributed communications system is comprised of a plurality of cells 15, adjacent cells having overlapping areas of communication coverage 16 as shown in FIG. 2 of the drawings. As the mobile 4 traverses an area covered by the first base station 2 and/or enters an area covered by the second base station 3, the established communications link 1 to the first base station 2 degrades. Degradation of the communications link 1 between a base station 2 and a mobile 4 occurs for many reasons including relative disadvantage of mobile transmit power to base station transmit power, distance, obstructions, and heavy mobile traffic within the cell 15. At such a time, it may be desirable to transfer the communications link 1 from the first base station 2 to the second base station 3. In some mobile communication implementations, a single base station 2 handles a plurality of channels. It is also possible that an established channel degrades, but an alternate channel to the same physical base station is available. At such a time, it may be desirable to transfer the communications link 1 from the established communications link channel to an alternate channel in direct communication with the same physical base station.

Figure 3:
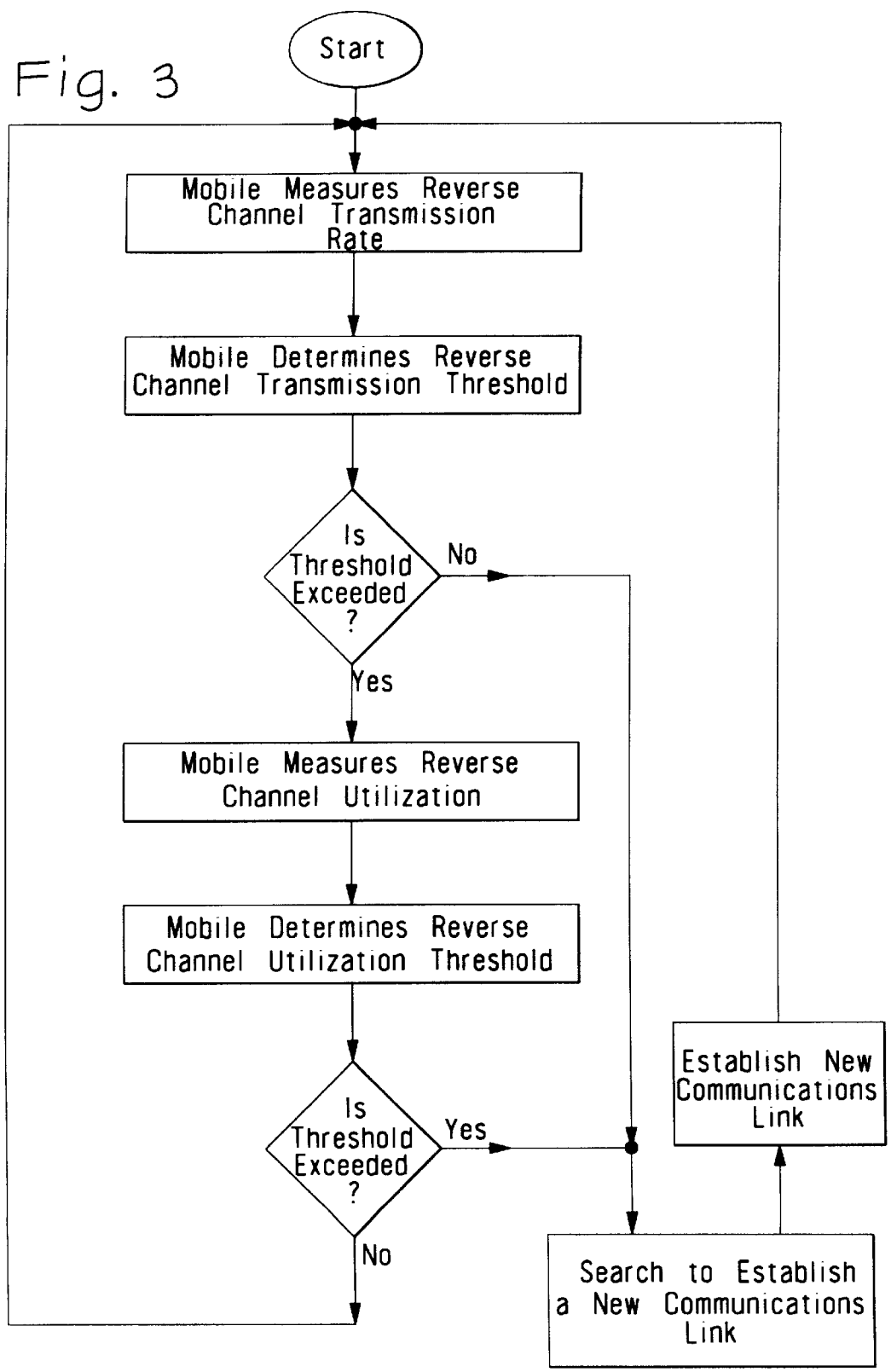
FIG. 3 is a flow chart illustrating the steps taken to make a decision about whether to initiate a channel hop in a system according to the teachings of the present invention.

In order to recognize degradation of the established communications link 1, the mobile 4 constantly measures reverse channel transmission parameters. In a specific embodiment of a system according to the teachings of the present invention, the mobile 4 measures reverse channel transmission success rate and reverse channel utilization. By virtue of the measurement of a reverse channel transmission parameter and the inherent knowledge of the forward channel transmission, the mobile is able to assess the quality of the round trip communication. Assessment of the round trip communication is used to assess the quality of the communications link 1 between the mobile 4 and the base station 2. Each reverse channel transmission parameter is assessed against a threshold. If either reverse channel transmission parameter exceeds the determined threshold, the mobile initiates a search for an alternate communications link 1 that may be established. The alternate communications link 1 may be a different channel transmitted from the same base station or a channel on an alternate base station. With specific reference to FIG. 3 of the drawings, there is shown a flow chart showing an embodiment of a method of transferring a communication link 1 from a first base station 2 to a second base station 3. Nomenclature for the change in a communications link between the mobile and the first base station to the second base station is termed either a "cell transfer" or a "channel hop". While the term "cell transfer" is typically used to describe transfer of a communications link from a first base station to a second base station, and the term "channel hop" is typically used to describe transfer of a communications link from an established channel to an alternate channel, the teachings of the present invention are directed toward the initiation of either type of communications link transfer. The term "cell transfer" is used herein interchangeably with the term "channel hop" and is intended, therefore, to encompass either type of communications link transfer.

A cell transfer occurs automatically when the established communications link 1 begins to degrade. When the mobile 4 decides that the established communications link 1 is no longer acceptable, the mobile 4 severs the link and searches for an acceptable alternate communications link. Once identified, the mobile 4 establishes the alternate communications link. The process of severing the communications link, searching for an alternate communications link, identifying an acceptable alternate communications link, and establishing the new communications link occurs seamlessly, that is without apparent interruption of information transfer.

Figure 4:
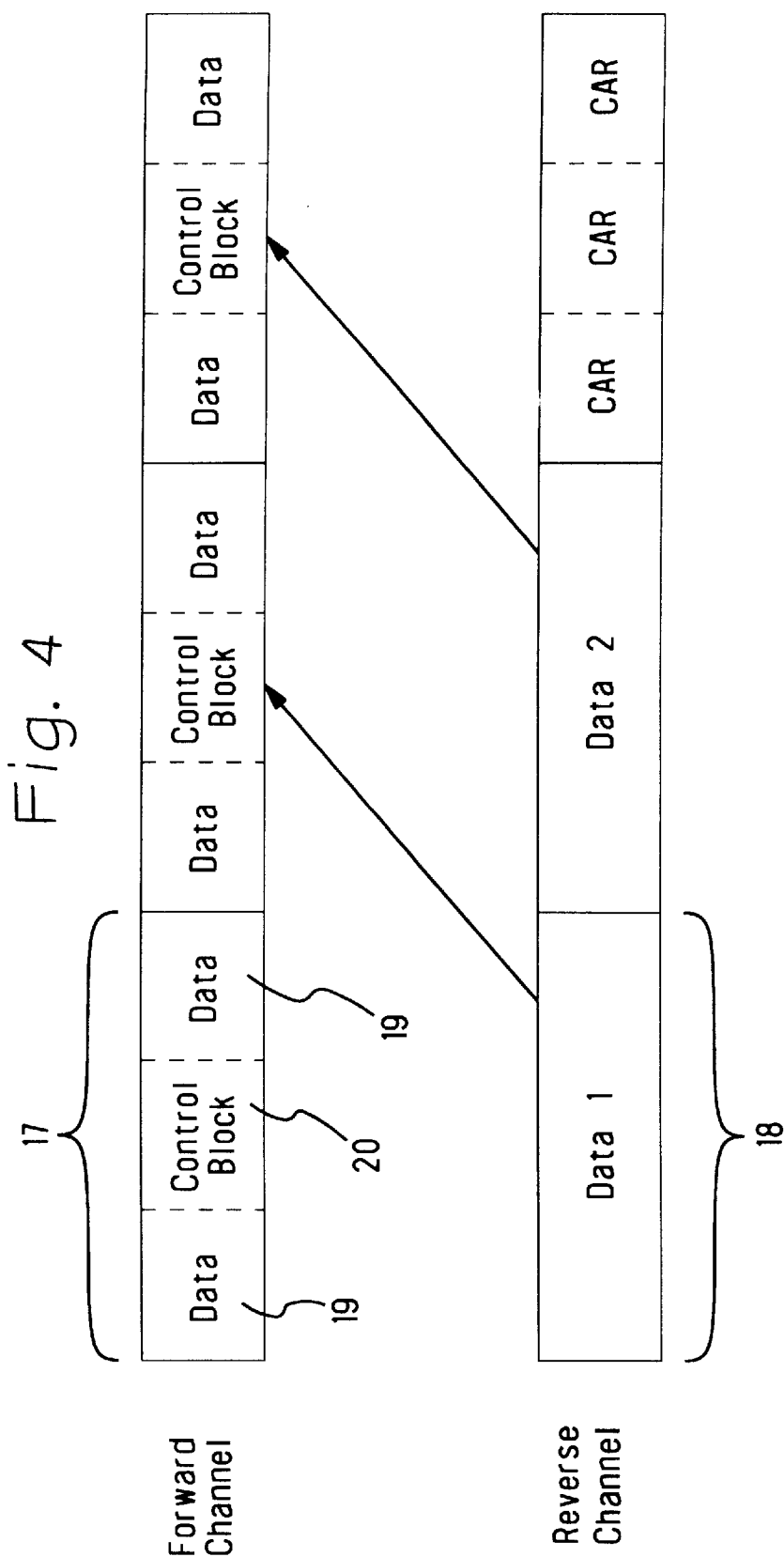
FIG. 4 is a diagrammatic view of a plurality of forward and reverse channel message blocks illustrating the information content and relative position in time for an embodiment of a system according to the teachings of the present invention.
Figure 5:
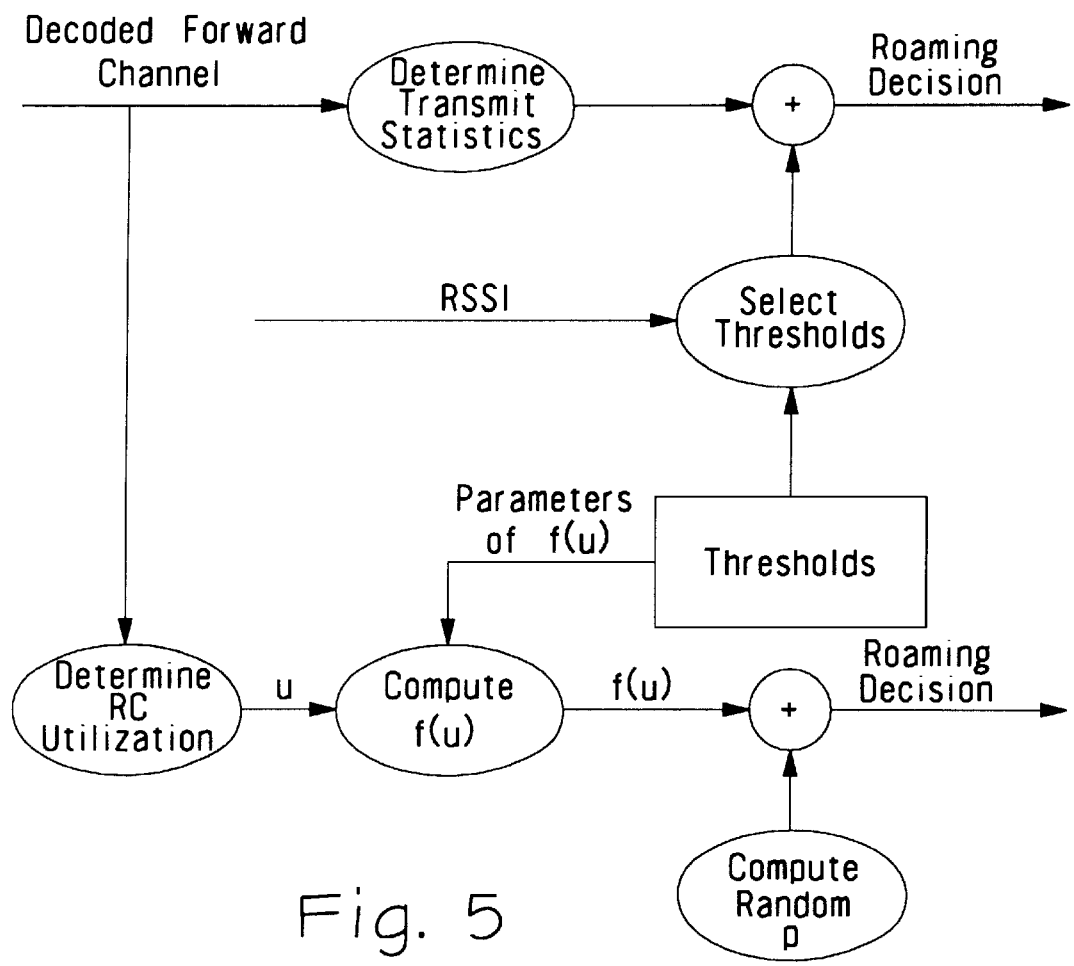
FIG. 5 is diagram illustrating the logical flow of computations made by the mobile in an embodiment of a system according to the teachings of the present invention in order to determine whether to offer a decision to transfer to a second base station.

With specific reference to FIG. 4 of the drawings, there is shown a logical representation of forward and reverse channel message blocks 17,18 respectively. Each forward and reverse channel message block 17,18 is 30 msec in duration. The forward and reverse channel message blocks 17, 18 are logically related in that the forward channel message block 17 30 msec subsequent in time to the reverse channel message block 18 contains status information regarding the results of the transmission of the reverse channel message block 18. The reverse channel message block 18 and the forward channel message block 17 30 msec prior in time represent a round trip, i.e. a mobile's 4 transmission and a base station 2 response to the transmission, in the communications link 1 between the mobile 4 and the base station 2.

The forward channel message block 17 is transmitted to all mobiles 4 in the cell 15. All mobiles 4 contend for the opportunity to transmit to the base station 2 on the reverse channel using one or more of the reverse channel message blocks 18. Each reverse channel message block 18, therefore, contains information content for only one mobile 4. The base station 2 transmits continuously over the forward channel to all of the mobiles 4 in the cell 15 regardless of whether there is information to convey in order to maintain a communications link 1. The forward channel control block 20 consistently contains information used by the system.

Each forward channel message block 17 has two data blocks 19 separated in time by a control block 20. The two data blocks 19 are related in that they are logically grouped as a single block of data transmitted by the base station 2. The data blocks 19 contain digital information content. The control block 20 contains administrative information used by the mobile 4 to perform channel access arbitration and to assess reverse channel transmission quality.

Each mobile 4 attempts to transmit only when it has information to convey to the base station 2. Arbitration of the reverse channel contention is performed by way of a reservation process. A portion of the control block 20 comprises a reservation identification 21. Typically, the mobile 4 is listening to transmissions from the base station 2 over the established communications link 1. Accordingly, the reverse channel is often quiet and not transmitting reverse channel transmission blocks 18. When the mobile 4 wishes to transmit information to the base station 2, the mobile 4 monitors the value of the reservation identification 21 in the control block 20. A reservation identification 21 having a zero value indicates that a next 30 msec reverse channel message block 18 is unreserved ("IDLE") and will not be used by one of the mobiles 4 in the cell 15 to transmit information. Seeing that the next reverse channel message block 18 is free, the mobile 4 wishing to transmit information first sends a channel access request ("CAR") over 1 of 3 10 msec adjacent logical microslots in the next reverse channel message block 18. As can be appreciated by one of ordinary skill in the art, when the reverse channel message block 18 is used to transmit a CAR to the base station 2, it is not used to transfer information content. Advantageously, up to three mobiles 4 are able to send a CAR on one of the reverse channel message blocks 18. The CAR comprises a randomly generated four digit identifier. The mobile 4 that sent the CAR monitors the control block 20 of the subsequent forward channel message blocks 17. When the mobile 4 recognizes the reservation identification 21 in the control block 20 in response to its CAR, it begins to transmit its information in the next 30 msec reverse channel message block 18. The control block 20 of the forward channel message block 17 that is 30 msec subsequent to the reverse channel message block 18 containing information, indicates a receipt status to the mobile 4 with an ACKnowledge (ACK) or a No AcKnowledge (NAK) informing the mobile 4 as to whether or not the information was received. The mobile 4 uses the ACK/NAK receipt status information to measure the reverse channel transmission success rate 8.

The receipt status in the control block 20 of the forward channel message block 19 includes an acknowledgment of successful transmission (ACK), unsuccessful transmission (NAK), or absence of data (IDLE) in the respective reverse channel message block 18. The mobile 4 measures the reverse channel transmission success rate by assessing the quantity of messages transmitted and received (ACK) by the mobile 4 as a ratio relative to the total quantity of messages transmitted by the mobile 4 over a given time duration. In an embodiment of the invention, a 10 sec block average is used. The mobile determines a threshold against which the measured reverse channel transmission success rate 8 is compared. In an embodiment of the invention, the mobile 4 has a fixed threshold value resident in memory which is part of the electronics of the mobile 4. Alternatively, the threshold values may be dynamically assigned by the base station 2 and transmitted to the mobile 4 or set directly by a user of the mobile 4. Alternatively, the threshold value can be a function of another known or measured parameter such as the signal strength received by the base station 2 and conveyed to the mobile 4 in the control block 20 or the signal strength received and measured by the mobile 4. To improve the reliability of the system, regardless of how the threshold values are determined, when the mobile is initially powered, there are default settings resident in the mobile used for the initial communications link 1. If the measured reverse channel transmission success rate is below the threshold value, the mobile 4 severs the established communications link and initiates a search for an alternate communications link.

Figure 6:
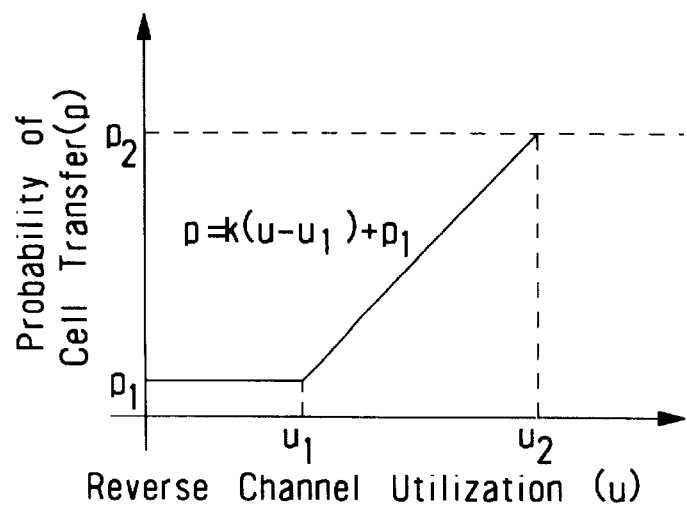
FIG. 6 is a diagram illustrating a piecewise linear function used in an embodiment of a system according to the teachings of the present invention to determine the probability of offering a decision to transfer to a second base station based upon a reverse channel utilization parameter.

The mobile 4 also measures the reverse channel utilization as a reverse channel transmission parameter. The mobile 4 measures the reverse channel transmission parameter by assessing the quantity of reverse channel message blocks 18 having an absence of data (IDLE) as a ratio relative to the total quantity of reverse channel message blocks 18 available during a given time duration such as 10 sec. The mobile 4 further determines an advisability of cell transfer. As an example, the advisability of cell transfer is represented as a piecewise linear function of utilization as illustrated in FIG. 6 of the drawings. A low value for reverse channel utilization represents a generally available reverse channel and generally light reverse channel traffic. Below a certain utilization threshold it is inadvisable to initiate cell transfer because there are a sufficient number of idle reverse channel message blocks that the likelihood of successfully contending for transmission during one of them is high. In an embodiment of the invention, an advisability of zero is assigned to a reverse channel utilization value equal to or less than 30%. The value of relative low utilization is a function of many variables and the type of communications system. The utilization parameters, therefore, are empirically derived. A high value for reverse channel utilization represents a relative unavailability of the reverse channel. Above a certain utilization threshold, therefore, regardless of the existing transmission success rate, it is prudent to initiate cell transfer to better equalize communications traffic among adjacent cells and more efficiently use available bandwidth in the communications link 1. It is not, however, always advisable for all mobiles 4 in a cell to initiate cell transfer because the utilization exceeds some threshold. A preferable approach is for some of the mobiles 4 to initiate transfer and for the remaining mobiles 4 to maintain communication over the established communications link 1 in order to approach an optimum level of communications link usage. Accordingly, at a value of u2, for example 60% reverse channel utilization, a probability of p2, for example 0.30 is assigned.

The mobile 4 calculates the advisability (p) of cell transfer as a linear function of the measured reverse channel utilization (u) if the measured reverse channel utilization falls between the values of u1 and u2, for example 40 and 60 respectively, according to the function:

$$p(u)=k(u-u1)+p1$$

where k=1.5, u1=40, p1=0.

The mobile further generates a random number between 0 and 100 against which the percentage advisability, p(u), of cell transfer value is compared. If the calculated advisability of cell transfer exceeds the value of the randomly generated number, the mobile 4 initiates cell transfer. The function for determining the advisability of cell transfer is shown as a piecewise linear function of reverse channel utilization. Alternative functions are equally applicable such as a piecewise linear function having different defining parameters, a continuously monotonically increasing function between zero and some level of probability and reverse channel utilization, or any other complex function deemed appropriate.

In an embodiment of a system according to the teachings of the present invention, either the reverse channel transmission success rate or the reverse channel utilization may be used in order to assess the desirability of cell transfer. In an alternate embodiment, both reverse transmission parameters may be assessed and if either parameter indicates the desirability of cell transfer, the mobile 4 initiates such a transfer. In yet another alternate embodiment, both reverse transmission parameters may be assessed and only if both parameters indicate the desirability of cell transfer, the mobile 4 initiates such a transfer.

Other advantages of the invention are apparent from the detailed description by way of example, and from the accompanying drawings, and from the scope of the appended claims.

We claim:

1. A cell transfer method, comprising:
    measuring by a mobile one or more reverse channel transmission parameters in a communications link between a base station and the mobile;
    assessing by the mobile the one or more measured transmission parameters against one or more thresholds;
    initiating by the mobile a search for an alternate communications link in accordance with the assessment.

2. A cell transfer method as recited in claim 1 wherein the step of measuring the transmission parameters of the reverse channel includes measuring the reverse channel transmission success rate comprising:
    transmitting a reverse channel message block,
    transmitting a forward channel message block with an indication as to whether the reverse channel message block was received, and assessing the quantity of transmitted and received reverse channel message blocks relative to the quantity of transmitted reverse channel message blocks.

3. A cell transfer method as recited in claim 2 wherein measuring one or more reverse channel transmission parameters comprise measuring reverse channel utilization.

4. A cell transfer method as recited in claim 3 wherein the step of assessing utilization comprises:
    assessing the quantity of idle reverse channel message blocks relative to the total number of reverse channel message blocks.

5. A cell transfer method as recited in claim 2 and further comprising:
    determining the one or more thresholds against which the reverse channel transmission success rate is compared, values of the one or more thresholds being based upon the forward channel received signal strength,
    comparing the threshold value against the measured reverse channel transmission success rate, and
    offering a decision to transfer to a second base station if the measured reverse channel transmission success rate is below the determined one or more threshold values.

6. A cell transfer method as recited in claim 2 wherein values of the one or more thresholds are fixed quantities known by the mobile.

7. A cell transfer method as recited in claim 2 wherein values of the one or more thresholds are dynamic quantities.

8. A cell transfer method as recited in claim 2 wherein values of the one or more thresholds are offered by a user of the mobile.

9. A cell transfer method as recited in claim 8 and further comprising:
    determining a first threshold value,
    comparing the first threshold value against the reverse transmission success rate,
    offering a first decision to transfer,
    determining a second threshold value,
    comparing the second threshold value against the reverse channel utilization,
    offering a second decision to transfer, and
    transferring the communication link from the established communications link to an alternate communications link if either the first or second decision to transfer is affirmative.

10. A cell transfer method as recited in claim 8 and further comprising:
    determining a first threshold value,
    comparing the first threshold value against the reverse channel transmission success rate,
    offering a first decision to transfer,
    determining a second threshold value,
    comparing the second threshold value against the reverse channel utilization,
    offering a second decision to transfer, and
    transferring the communication link from the established communications link to an alternate communications link if the first and second decision to transfer is affirmative.

11. A cell transfer method as recited in claim 1 wherein measuring one or more reverse channel transmission parameters comprises measuring reverse channel utilization.

12. A cell transfer method as recited in claim 1 wherein measuring one or more reverse channel transmission parameters includes measuring a reverse channel utilization comprising assessing the quantity of transmitted and received reverse message blocks relative to the quantity of transmitted reverse channel message blocks and further comprising assessing the reverse channel utilization.

13. A cell transfer method as recited in claim 1 wherein measuring one or more reverse channel transmission parameters comprises:
    transmitting continuously in time forward channel message blocks on the forward channel, each message block indicating whether a respective reverse channel message block is idle.

14. A cell transfer method as recited in claim 13 and further comprising:

determining values of the one or more thresholds against which the reverse channel utilization is compared by calculation of a cell transfer advisability parameter as a function of reverse channel utilization, generating a random number within a possible range of the cell transfer advisability parameters, comparing the random number against the cell transfer advisability parameter, and offering a decision to transfer to a second base station if the cell transfer advisability parameter is greater than the random number.

15. A cell transfer method as recited in claim 1 wherein searching occurs only if the mobile has transmitted on the reverse channel without success.

16. A cell transfer method as recited in claim 1 wherein measuring the reverse channel transmission parameters further comprises:

measuring a reverse channel transmission success rate, and measuring a reverse channel utilization.

* * * * *